US009869272B1

(12) United States Patent
Stuart et al.

(10) Patent No.: US 9,869,272 B1
(45) Date of Patent: Jan. 16, 2018

(54) PERFORMANCE OF A TRANSCRITICAL OR SUPERCRITICAL CO2 RANKIN CYCLE ENGINE

(76) Inventors: Martin A. Stuart, Burbank, CA (US); Stephen Cunningham, Burbank, CA (US)

(*) Notice: Subject to any disclaimer, the term of this patent is extended or adjusted under 35 U.S.C. 154(b) by 245 days.

(21) Appl. No.: 13/452,372

(22) Filed: Apr. 20, 2012

Related U.S. Application Data

(60) Provisional application No. 61/477,293, filed on Apr. 20, 2011, provisional application No. 61/477,762, filed on Apr. 21, 2011, provisional application No. 61/636,236, filed on Apr. 20, 2012, provisional application No. 61/625,940, filed on Apr. 18, 2012.

(51) Int. Cl.
*F02B 53/00* (2006.01)
*F02G 1/04* (2006.01)
*F02G 1/053* (2006.01)

(52) U.S. Cl.
CPC .............. *F02G 1/04* (2013.01); *F02G 1/053* (2013.01)

(58) Field of Classification Search
USPC .......................................... 60/647, 651, 671
See application file for complete search history.

(56) References Cited

U.S. PATENT DOCUMENTS

| | | | |
|---|---|---|---|
| 556,032 A | 3/1896 | Stanbridge | |
| 2,085,070 A | 11/1933 | Pavlecka | |
| 2,300,191 A * | 10/1942 | Young | 137/625.48 |
| 2,301,667 A | 11/1942 | Lutz | |
| 2,606,541 A | 8/1952 | Lutz | |
| 3,237,403 A * | 3/1966 | Feher | F01K 7/32 |
| | | | 60/647 |
| 3,359,957 A | 10/1966 | Mantzel | |
| 3,516,392 A | 6/1970 | Morgan | |
| 3,580,228 A * | 5/1971 | Rocha | F01C 9/002 |
| | | | 123/18 A |
| 3,990,405 A | 11/1976 | Kecik | |
| 4,058,088 A * | 11/1977 | Brown | F01B 5/00 |
| | | | 123/18 R |
| 4,127,036 A | 11/1978 | Pinto | |

(Continued)

FOREIGN PATENT DOCUMENTS

WO   WO 92/14036   8/1992

OTHER PUBLICATIONS

Chen et al. A comparative study of the carbon dioxide transcritical power cycle compared with an organic rankine cycle with R123 as working fluid in waste heat recovery. Applied Thermal Engineering 26 (2006), pp. 2142-2147.*

(Continued)

*Primary Examiner* — Mark Laurenzi
*Assistant Examiner* — Mickey France
(74) *Attorney, Agent, or Firm* — Bodi Law LLC

(57) ABSTRACT

A Rankine Expander System that converts low quality heat (heat usually at temperatures below 400 degrees Celsius) to electricity by using the properties of trans-critical $CO_2$. The system is comprised of a compressor, an expander, three heat exchangers, and a permanent magnet alternator (PMA). It operates at pressures and temperatures that hold the $CO_2$ above its critical point for the full cycle, and as such, attains high efficiencies even at low power. Under some conditions the efficiency can exceed 50%.

23 Claims, 15 Drawing Sheets

(56) References Cited

U.S. PATENT DOCUMENTS

| | | | |
|---|---|---|---|
| 4,257,752 A * | 3/1981 | Fogarty | F01C 1/07 417/481 |
| 4,663,939 A * | 5/1987 | Cosby | 60/650 |
| 4,970,995 A | 11/1990 | Parsons | |
| 5,188,083 A | 2/1993 | Reisser et al. | |
| 5,203,287 A | 4/1993 | Wiley | |
| 5,222,463 A | 6/1993 | Farrell | |
| 5,303,546 A | 4/1994 | Farrell | |
| 5,323,737 A | 6/1994 | Farrell | |
| 5,324,176 A | 6/1994 | Farrell | |
| 5,327,745 A * | 7/1994 | Gilmour | 62/467 |
| 5,467,744 A | 11/1995 | Farrell | |
| 5,527,165 A | 6/1996 | Schadeck | |
| 5,739,307 A | 4/1998 | Johnson, Jr. et al. | |
| 5,794,573 A | 8/1998 | Sunley | |
| 6,293,775 B1 | 9/2001 | Bakhtine | |
| 6,302,253 B1 | 10/2001 | Link et al. | |
| 6,814,205 B2 | 11/2004 | Feldhaus et al. | |
| 6,860,373 B2 | 3/2005 | Kundermann et al. | |
| 6,880,494 B2 | 4/2005 | Hoose | |
| 6,990,942 B2 | 1/2006 | Takeuchi | |
| 7,114,605 B2 | 10/2006 | Grosspietsch et al. | |
| 7,182,061 B2 | 2/2007 | Georgescu | |
| 7,237,542 B2 | 7/2007 | Reisser | |
| 7,240,645 B2 | 7/2007 | Reisser | |
| 7,380,527 B2 | 6/2008 | Reisser | |
| 7,415,962 B2 | 8/2008 | Reisser | |
| 7,600,490 B2 | 10/2009 | Reisser | |
| 7,721,701 B2 | 5/2010 | Dec | |
| 7,730,869 B2 | 6/2010 | Li | |
| 8,210,151 B2 | 7/2012 | Drachko | |
| 2004/0184923 A1 * | 9/2004 | Iwanami et al. | 417/221 |
| 2005/0050892 A1 * | 3/2005 | Gould | 60/670 |
| 2007/0175212 A1 * | 8/2007 | Uno et al. | 60/519 |
| 2007/0199323 A1 * | 8/2007 | Yamaguchi et al. | 60/670 |
| 2007/0199537 A1 | 8/2007 | Morgado | |
| 2008/0245345 A1 | 10/2008 | Huettlin | |
| 2009/0165461 A1 * | 7/2009 | Klassen et al. | 60/682 |
| 2009/0266075 A1 * | 10/2009 | Westmeier | F01K 25/103 60/651 |
| 2010/0024421 A1 * | 2/2010 | Litwin | F02C 1/05 60/641.8 |
| 2010/0287920 A1 * | 11/2010 | Duparchy | 60/320 |
| 2012/0174585 A1 * | 7/2012 | Rampen | F02G 1/043 60/682 |

OTHER PUBLICATIONS

Dostal. A supercritical carbon dioxide cycle for next generation nuclear reactors. Department of Nuclear Engineering, Massachusetts Institute of Technology (2004).*

Yamaguchi et al. Solar energy powered Rankine cycle using supercritical CO2. Applied Thermal Engineering 26 (2006), pp. 2345-2354.*

SINTEF Energy Research; TR No. TR A6570; Date: Oct. 8, 2007; Project No. 16X732; Technical Report entitled "Co2 as working fluid in a Rankine cycle for electricity production from waste heat sources on fishing boats".

The MIT Center for Advanced Nuclear Energy Systems; Advanced Nuclear Power Technology Program; "A Supercritical Carbon Dioxide Cycle for Next Generation Nuclear Reactors"; V. Distal, M.J. Driscoll, P. Hejzlar: MIT-ANP-TR-100; Mar. 10, 2004.

International Search Report dated Nov. 11, 2011.

Wikipedia, the free encyclopedia; Swing-Piston Engine; 3 pages; Otto Lutz; internal combustion swing-piston engine; publication date unknown.

Chen et al.; A comparative study of the carbon dioxide transcritical power cycle compared with an organic rankine cycle with R123 as working fluid in waste heat recovery; Applied Thermal Engineering 26 (2006); pp. 2142-2147.

Yamaguchi et al.; Solar energy powered Rankine cycle using supercritical CO2; Applied Thermal Engineering 26 (2006); pp. 2345-2354.

Dostal; A Supercritical Carbon Dioxide Cycle for Next Generation Nuclear Reactors; Czech Technical University in Prague, Czech Republic (2006); From Massachusetts Institute of Technology Libraries, Jun. 16, 2004.

* cited by examiner

PERFORMANCE OF A TRANSCRITICAL OR SUPERCRITICAL CO2 RANKIN CYCLE ENGINE

CROSS-REFERENCES TO RELATED APPLICATIONS

This application claims the benefit of provisional application Ser. No. 61/477,293, filed on Apr. 20, 2011, and incorporated herein by reference. This application also claims the benefit of provisional application Ser. No. 61/636,236, filed on Apr. 20, 2012, and also incorporated herein by reference. This application also claims the benefit of provisional application Ser. No. 61/477,762, filed on Apr. 21, 2011, and incorporated herein by reference.

This application utilizes features of the oscillating engine disclosed in U.S. patent application Ser. No. 13/074,510 that was filed on Mar. 29, 2011, and is hereby incorporated by reference in its entirety. It also utilizes features of provisional application Ser. No. 61/625,940 filed on Apr. 18, 2012, disclosing a polygonal oscillating engine design, also incorporated herein by reference.

BACKGROUND OF THE INVENTION

Transcritical $CO_2$ Rankine Cycle Engine expander systems can be utilized for recovering heat energy from a number of heat sources, from the waste heat of automobile combustion processes (e.g., exhaust heat), to the combustion of waste materials, solar energy, and many other heat sources. However, efficiencies of this process have been less than desirable. An improved process and design for recovering such heat is desirable.

Furthermore, the transportation technology industry employs as its dominant chemical energy conversion device of choice, the internal combustion engine (ICE) using the Otto or Diesel cycle. Some experimental turbine powered vehicles were built as test cases but they proved lower in efficiency and had higher manufacturing costs due to material requirements necessitated in gas turbine engines. The Gas turbine engine found its best application in aircraft due to a high power to weight ratio permitting more freight for the same design. Central power generating stations use a turbine expander due to a high demonstrated torque conversion efficiency usually in the range of 85%. The downside to turbine expanders is they require a high volume of gas to run efficiently. Therefore they do not lend themselves to very low power conversion systems much under significant fractions of a megawatt.

The energy balance is a metric of performance for vehicles such as passenger cars, which can be a useful means of grasping the percentage of the fuels energy content, being utilized in actually moving the passenger car along a chosen road. For primary passenger cars using only an ICE, the percentage of input energy delivered to the transmission is approximately 22-36% for a gasoline powered car and 42% for a Diesel. The energy lost to stop-start cycle's, cuts that amount to less than 13% for gasoline cars and under 20% for passenger Diesel cars.

In recent years hybrid electric cars have shown dramatic improvements to the energy utilization by averaging the fluctuations in stop start cycles. Thereby raising the miles traveled per gallon of primary fuel, and simultaneously lowering emissions per mile by the efficiency improvement. The improvement was the result of converting the fuel into stored electricity by having the ICE drive a permanent magnet alternator, which then charged a storage device such as a Lithium ion battery. Still the improvement can only approximate the ICE efficiency, no matter what the vehicle application was, whether it was a heavy truck, train, ship or aircraft.

Furthermore, economic instability has placed a greater demand on the performance of energy extraction devices. Notably Transportation technology has had pressure from two fronts, the cost of operation and the simultaneous demand of environmental impact reduction.

An improved process for solving one or more of the above identified problems is desirable.

SUMMARY OF THE INVENTION

Disclosed herein is a greatly improved Transcritical $CO_2$ Rankine Cycle Engine "Rankine Expander System" that can more efficiently recover waste heat than has been previously disclosed. The Rankine Expander System takes heat from an external source and converts a part of it into electricity and exhausts the other part to an ambient temperature cooler. The external heat source can have many different forms. Heat can be generated by a solar collector farm that heats mineral oil at low pressure and pumps it to a heat exchanger inside the Rankine Expander System. Alternatively, heat can be collected from the waste heat of an industrial power generator, or from the waste heat of any internal combustion engine, or from the heat generated by nuclear waste. Each of these forms of heat has the characteristic of "low quality" in which the maximum temperature is not very high, on the order of a few hundred degrees Celsius. In general, this heat is exhausted to the environment through radiators or other forms of coolers. With the Rankine Expander System, a significant fraction of this heat can be converted to electricity.

Further presented is a compact hybrid electric power generator that also employs a trans-critical or super-critical $CO_2$ Rankine cycle engine, as a secondary power conversion source. This waste heat recovery engine draws its energy from the waste heat from the ICE. The basis for this higher performance hybrid is the Rankine ICE (running on any fuel) as disclosed in U.S. patent application Ser. No. 13/074,510 filed on Mar. 29, 2011, and provisional application Ser. No. 61/625,940 filed on Apr. 18, 2012, both incorporated by reference herein and the Rankine expander used as a torque conversion element, in place of a turbine as would be the normal choice for this application.

As an illustrative simplified example, an improved performance ICE puts about ¼ to ⅓ of its energy on the drive shaft, about ⅓ as heat from the heat conducted to the components in the engine and about ⅓ as heat in the exhaust gases.

The predicted performance efficiency range of a $CO_2$ Rankine cycle engine would be able to convert about 30% to more than 40%, of this waste heat energy into electricity. The improved supercritical $CO_2$ Rankine cycle engine, using higher than normal low side pressures (see FIGS. 8, 9, 10 & 11) which would also be used to drive the electric motors or charge a storage device. If half of the waste heat energy was converted into electric energy then this would constitute a doubling of energy extraction to be utilized by the vehicle that employed it.

The Rankine Expander System converts low quality heat (heat at temperatures below 700 degrees Celsius) to electricity by using the properties of trans-critical $CO_2$. The system consists of a compressor, an expander, three heat exchangers, and a permanent magnet alternator (PMA). It operates at pressures and temperatures that hold the $CO_2$ above its critical point for the full cycle, and as such, attains high efficiencies even at low power. Under some conditions the efficiency can exceed 50%. This makes the Rankine Expander System ideal for use with solar heat collectors, or using the waste heat from power generators, internal combustion engines, or even nuclear power plants or waste from nuclear power plants. This paper shows the operating conditions used to attain high efficiencies, and how these efficiencies can vary with controllable design parameters.

At its highest system view, the Rankine Expander System takes heat from an external source and converts a part of it into electricity and exhausts the other part to an ambient temperature cooler. The external heat source can have many different forms. Heat can be generated by a solar collector farm that heats mineral oil at low pressure and pumps it to a heat exchanger inside the Rankine Expander System. Alternatively, heat can be collected from the waste heat of an industrial power generator, or from the waste heat of any internal combustion engine, or from the heat generated by nuclear waste. Each of these forms of heat has the characteristic of "low quality" in which the maximum temperature is not very high, on the order of a few hundred degrees Celsius. In general, this heat is exhausted to the environment through radiators or other forms of coolers. With the Rankine Expander System, a significant fraction of this heat can be converted to electricity.

BRIEF DESCRIPTION OF THE DRAWINGS

The features and advantages of the examples described herein will become apparent to those skilled in the art to which this disclosure relates upon reading the following description, with reference to the accompanying drawings, in which.

DETAILED DESCRIPTION OF THE EXAMPLE EMBODIMENTS

Figure 1:
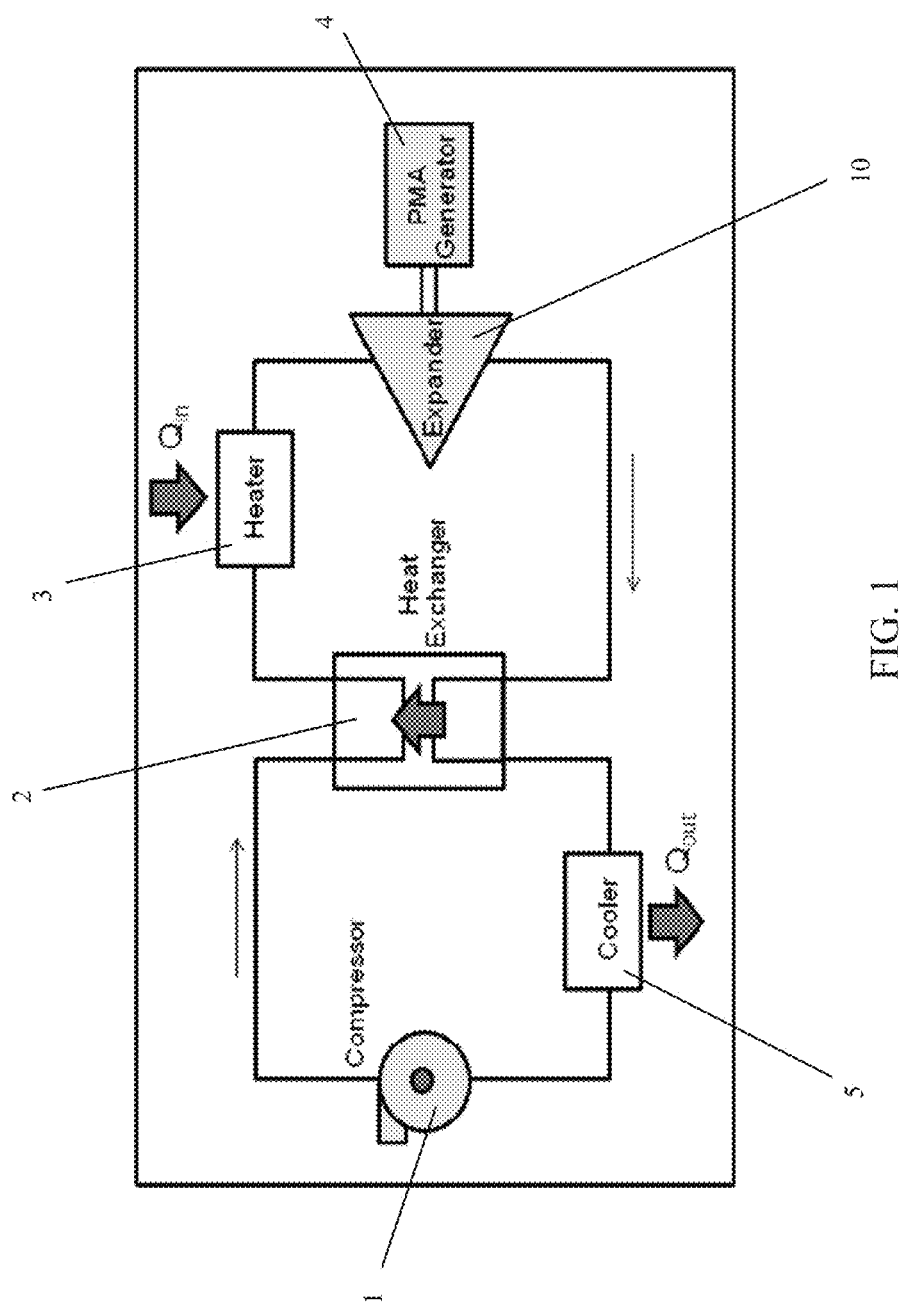
FIG. 1 shows a schematic of the six elements of the example Rankine Expander System.

An example embodiment of the Rankine Expander System is made up of six parts as shown in FIG. 1. The system operates on a thermodynamic cycle using the properties of high pressure $CO_2$ above its critical point. The $CO_2$ critical point is at a temperature of 31.1° C. and a pressure of 73.8 bar (or 1070 psi). The Rankine Expander System can operate anywhere in the pressure range between 80 and 200 bar and the temperature range between ambient temperature (even below 0° C.) and 400° C. The actual pressure change and resultant temperature rise are set by the specific design parameters of the system which depend on the desired output power and efficiency. How these values are chosen is the main topic of this paper.

The Rankine Expander System has a compressor 1 which takes $CO_2$ at near ambient temperature and a pressure above 80 bar and compresses it to a higher pressure (but below 200 bar). For a high pressure of 170 bar, the temperature is raised by about 10° C. The high pressure $CO_2$ then goes through an internal heat exchanger 2 where its temperature is raised by extracting heat from the higher temperature $CO_2$ that comes from the example expander 10. Then, the $CO_2$ passes through an external heater 3 (may be a second heat exchanger or other heat transmission source) that obtains heat generated from an outside source of energy. This heater/exchanger 3 raises the temperature of the $CO_2$ to its maximum operating value (between 250 and 700° C. depending upon the chosen value). This high pressure, high temperature $CO_2$ then enters the Rankine Expander 10 where the pressure drops to the starting pressure, the temperature drops by about 100° C., and the pressure change performs mechanical work. The Expander 10 converts the pressure of the expanding gas into a high torque rotational energy. The spinning shaft of the expander 10 drives a generator 4, such as a Permanent Magnet Alternator (PMA), which produces electricity. The trans-critical $CO_2$ that comes out of the Expander 10, still in its trans-critical state, enters the internal heat exchanger 2 where it transfers much of its heat to the $CO_2$ that is the output of the compressor 1. Finally, the $CO_2$ enters a cooler 5 (e.g., another heat exchanger) which reduces the temperature back to ambient temperature, and the cycle repeats.

The primary elements of the example Rankine Expander System, are thus the compressor 1, the expander 10, the permanent magnet alternator 4, and three separate heat exchangers 2, 3, and 5. External to the system is the heat source represented by $Q_{in}$ which will, in the example embodiment, provide high temperature liquid (e.g., mineral oil) to the input heat exchanger 3 and an electricity conversion module that converts the electricity from the PMA 4 into a form appropriate for the specific application.

The $CO_2$ Refrigerator:

The Rankine Expander System depends on the properties of $CO_2$ in its trans-critical phase for its proper function. These $CO_2$ properties have been known for a long time, and the trans-critical behavior has been used in refrigerators since the early 1900's. The interest dropped with the introduction of more efficient refrigerant gases in 1930, but interest in $CO_2$ has been renewed lately due to the increased awareness of the environmental impact of these refrigerant gases. $CO_2$ has the desirable property that it is benign with respect to the environment.

Figure 2:
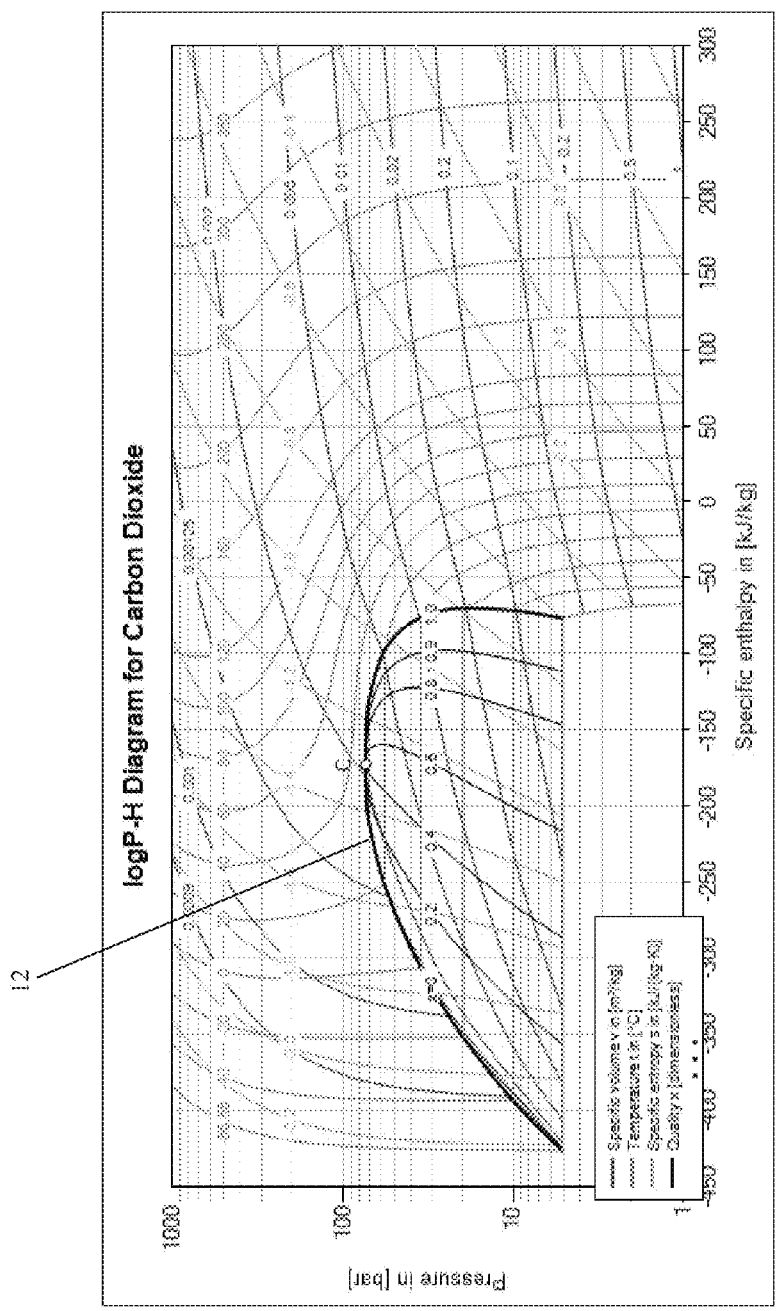
FIG. 2 shows a Molliere Diagram for $CO_2$ plots of pressure versus enthalpy.

The Molliere diagram for $CO_2$ is shown in FIG. 2. The commonly used Molliere diagram plots the properties of $CO_2$ on a pressure vs. enthalpy grid, in this case the pressure is shown on a logarithmic scale compressing the features above the critical pressure. The plot shows lines of constant temperature (isotherms), constant entropy (adiabatic curves), and constant density (or specific volume). The liquid-vapor line 12 is shown as a thick black line. Below that line, the $CO_2$ is a mixture of liquid and vapor and the term "quality" in this plot refers to the proportion of the mixture that is liquid and the portion that is vapor. (Note: a gas is a substance whose surface is defined by the container. A vapor is a substance that has a surface in contact with a liquid). Above the critical pressure, $CO_2$ behaves like a viscous gas in that it does not have an identifiable surface, but it flows like a liquid.

Figure 3:
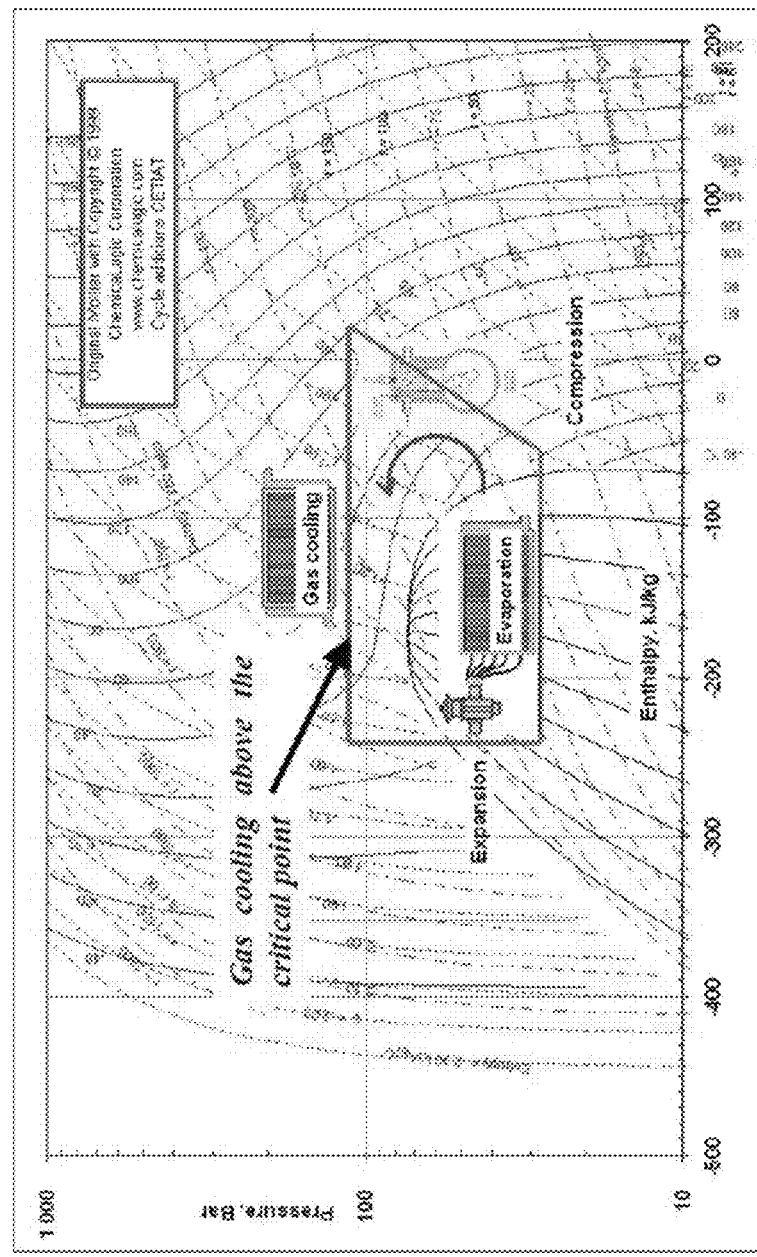
FIG. 3 shows a Molliere Diagram for $CO_2$ used for the Refrigeration Cycle.

The utility of the Molliere diagram comes from three features of the refrigeration cycle, two of which are used in the Rankine Expander cycle disclosed herein. The refrigeration steps are shown in FIG. 3. During the compression step, the gas follows a curve of constant entropy. This is an "adiabatic" compression which FIG. 3: The Molliere Diagram for $CO_2$ used for the Refrigeration Cycle is fast enough that negligible heat flows from the surrounding surfaces into the operating gas. During the two heat exchange steps, the gas remains at a constant pressure and therefore follows a horizontal line in the Molliere diagram. In the expansion step in the refrigeration cycle, the enthalpy remains constant as the gas passes through the expansion valve, and this shows as a vertical line in the Molliere diagram.

Figure 4:
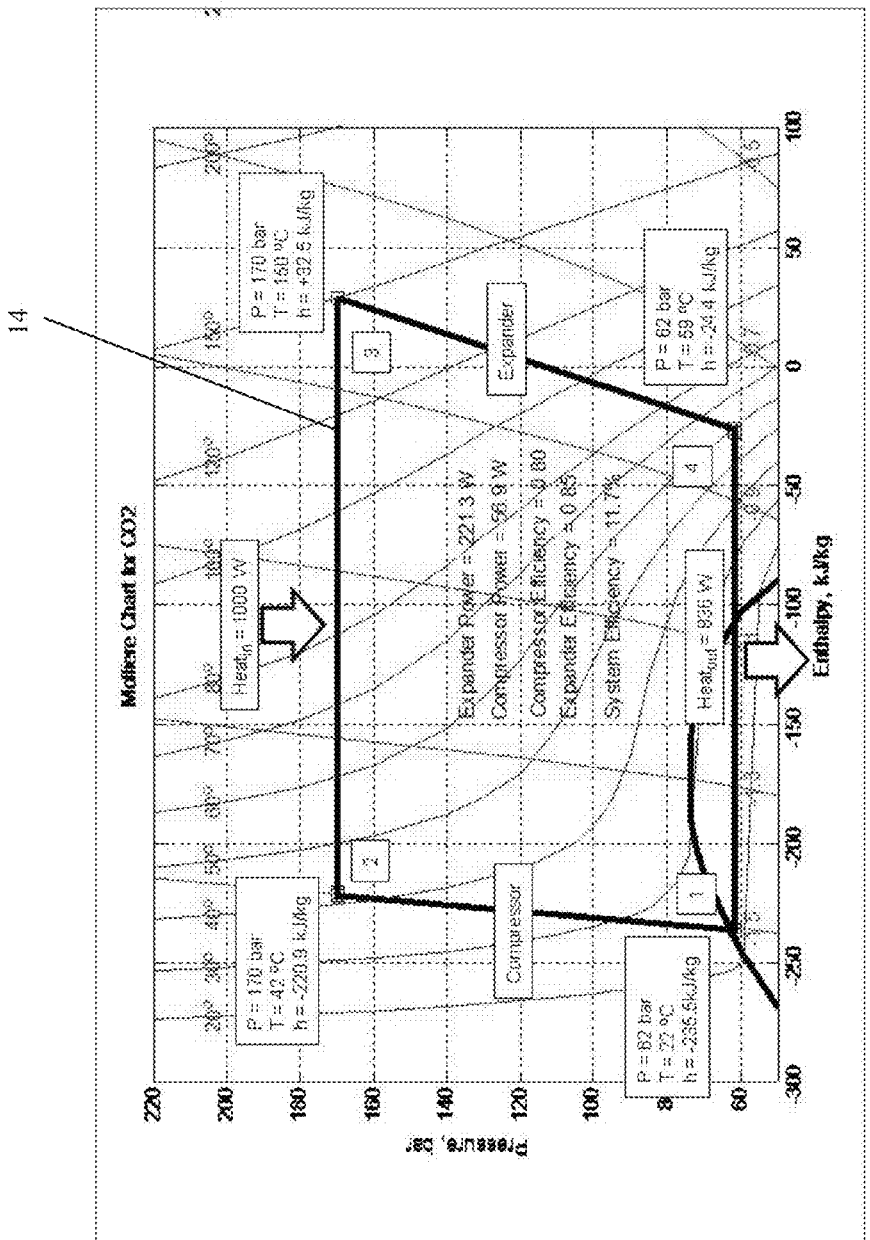
FIG. 4 shows a Molliere Diagram for an example $CO_2$ refrigeration cycle run in reverse for creating work.

A CO2 Expander System:

Previous work with the $CO_2$ cycle, in discussing its utility in an expander system, has been to emulate the refrigeration cycle except run in reverse. An example of this is shown in FIG. 4. Here, the cycle is shown by the solid line 14. The cycle starts at position 1 at a pressure of 62 bar and a temperature of 22° C. The $CO_2$ is compressed to a pressure of 170 bar, which raises the temperature to 42° C. (position 2). Heat is added, keeping the pressure constant until the trans-critical $CO_2$ is 150° C. at position 3. Next, the $CO_2$ moves through an expander where it performs work as the pressure drops to 62 bar and drops the temperature to 59° C. (position 4). Finally, the $CO_2$ is cooled (and condensed) to 22° C. and the cycle repeats.

The utility of the Molliere diagram is in using the value of enthalpy to determine the efficiency of the cycle. The change in the value of the enthalpy gives a measure of the energy needed in each step. For example, if in going from state 2 to state 3 the enthalpy changes by 253.4 (=32.5−(−220.9)) kJ/kg (kilo-Joules per kilogram), and if the heat added to the system is 1 kW (kilo-Watt), then the flow of $CO_2$ is 1/253.4 kg/sec=3.95 gm/sec (note: 1 kW=1 kJ/sec). Using the other enthalpy values in the cycle with this mass flow rate gives a compressor work output of 56.9 W, and expander work output of 221.3 W, and a heat exhausted of 836 W. For an expander/PMA efficiency of 0.85, the actual power generated is 188 W, and with a compressor efficiency of 0.80, the power consumed is 71 W, giving an overall system efficiency for this example of 11.7% (188−71=117 W net to 1000 W input).

Figure 5:
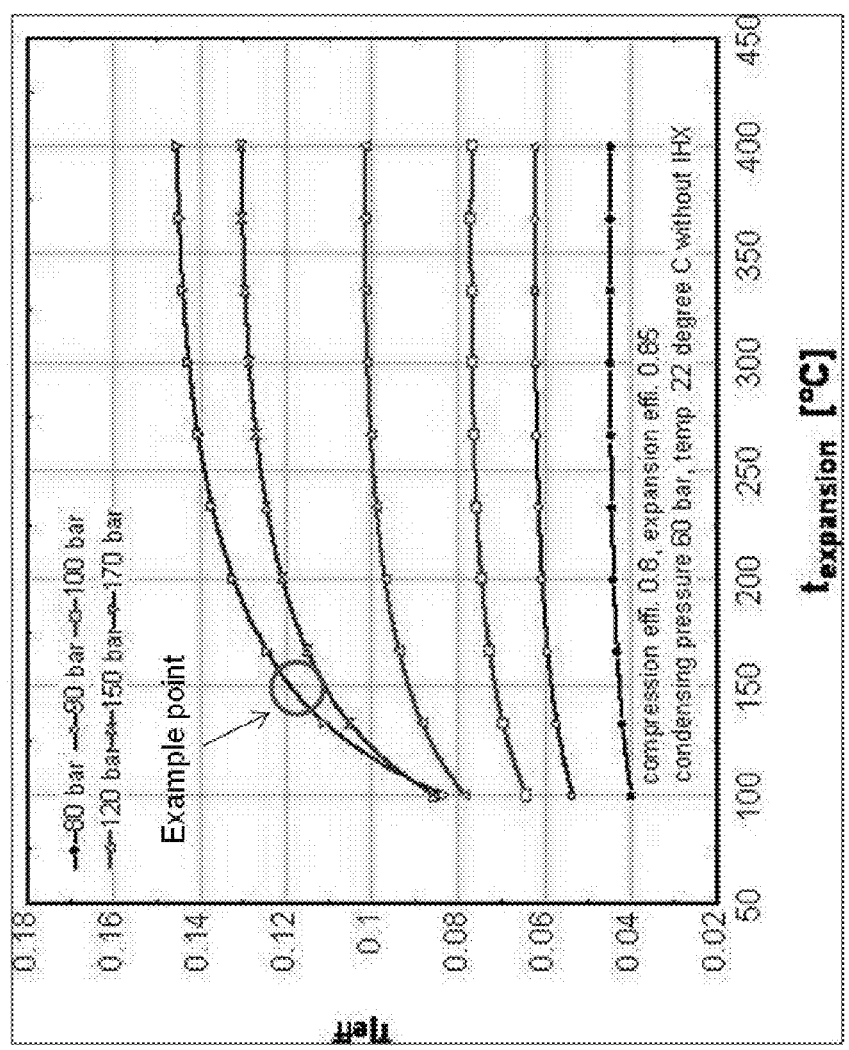
FIG. 5 shows plots of example calculated efficiencies for the Expander cycle for a variety of maximum pressures and temperatures.

The efficiencies for a variety of pressures and temperatures using this cycle have been studied in the past by several authors. FIG. 5 shows efficiencies for the Expander cycle for a variety of maximum pressures and temperatures, where the low pressure is 60 bar, and the condensing temperature is 22° C. There is no internal heat exchanger for these cases. For the cycle above with no internal heat exchanger, the efficiency is relatively low and tops out at less than 15% even at higher temperatures.

Figure 6:
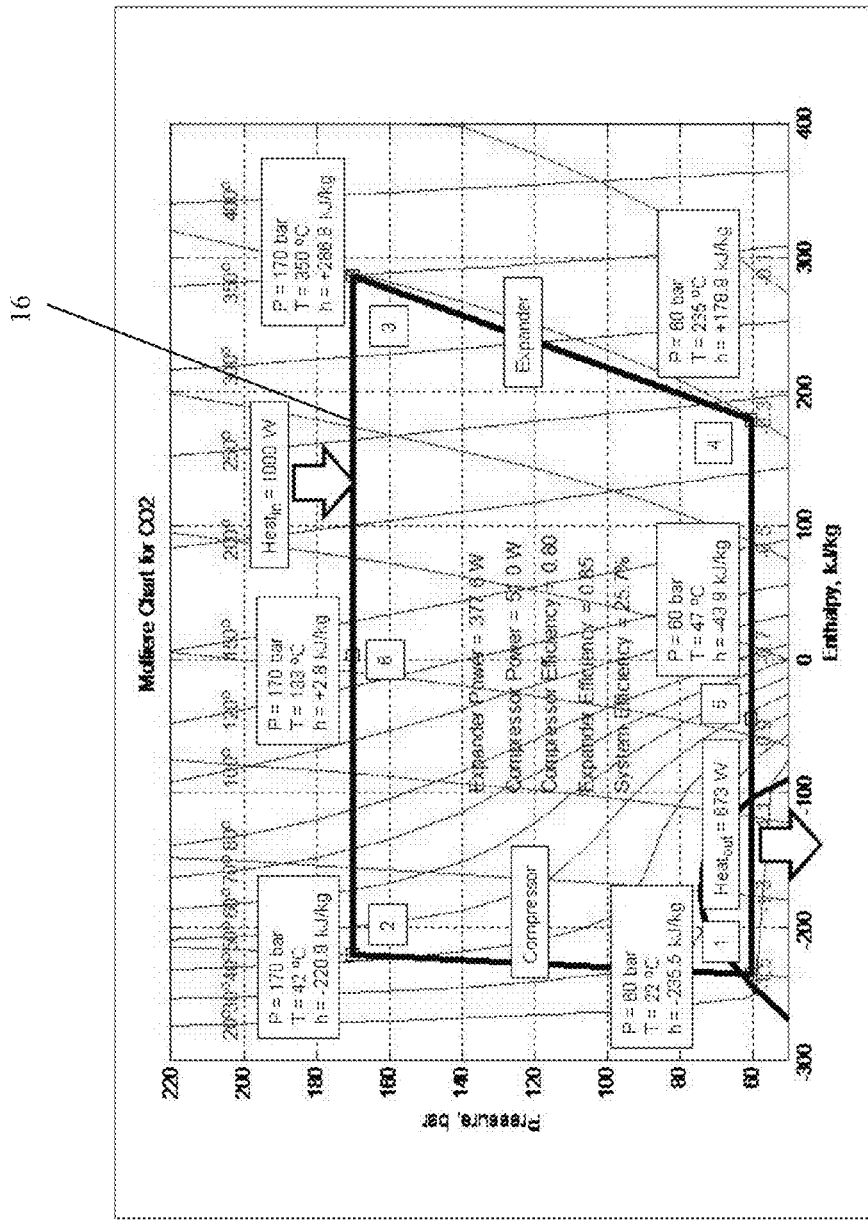
FIG. 6 shows a Molliere Diagram for an example $CO_2$ refrigeration cycle run in reverse using an internal heat exchanger.

The overall efficiency can be improved by adding an internal heat exchanger (as shown in FIG. 1) to the system. The internal heat exchanger transfers some of the heat that is normally exhausted to pre-heat the $CO_2$ before it enters the main heater. This has the effect of reducing the amount of input heat needed to reach the desired high temperature, and thereby increases the ratio of net output energy to input energy. This is shown in FIG. 6, which shows an example expander cycle with internal heat exchanger. The heat exchanger reduces the amount of heat in required to raise the temperature of the $CO_2$.

With the internal heat exchanger, the four step process in FIG. 4 therefore becomes a 6 step process 16 as shown in FIG. 6. For this example, the high pressure is set at 170 bar and the high temperature is set at 350° C. with the low pressure still at 60 bar and the low temperature at 22° C. The compression phase from position 1 to position 2 is the same as FIG. 4. But with the internal heat exchanger, heat is added raising the temperature to 133° C. at position 6. Then the external heat (1 kW in this example) is added raising the temperature further to 350° C. at position 3. The $CO_2$ moves through the expander performing work and cooling to 235° C. (position 4). This hot $CO_2$ then enters the internal heat exchanger and gives up some of its heat further cooling to 47° C. at position 5. The enthalpy decrease between position 4 and 5 is equal to the enthalpy increase between positions 2 and 6. In this example, the internal heat exchanger moves 784 W from the low pressure side to the high pressure side. Finally, the $CO_2$ goes through the external cooler to reduce the temperature to 22° C.

The 1 kW of input heat results in a flow of 3.53 g/sec of $CO_2$ (this number is the heat added divided by the enthalpy increase). This cycle shows that the ideal compressor requires 51 W, the ideal expander delivers 377.6 W, and the external heater supplies 1000 W for an ideal efficiency of 32.7%. If the assumed efficiency for the compressor is 80% and the assumed efficiency for the expander/PMA combination is 85%, then this efficiency drops to 25.7%.

Figure 7:
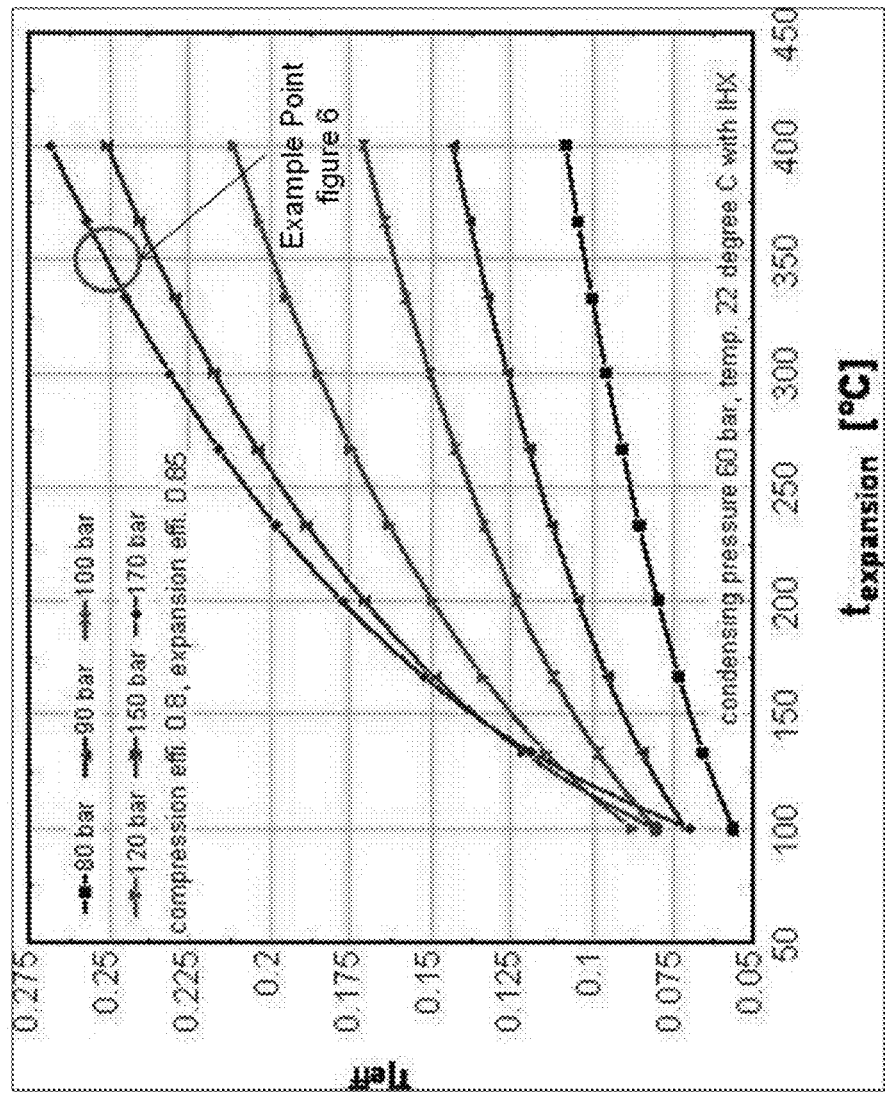
FIG. 7 shows a plot of example predicted efficiencies possible from a $CO_2$ expander system for various values of pressure and temperature using an internal heat exchanger.

The efficiency increases as the maximum temperature and pressure is increased. This is shown in FIG. 7, which is a plot showing predicted efficiencies possible from a $CO_2$ expander system for various values of pressure and temperature using an internal heat exchanger. For top pressures of 170 bar and temperatures of 400° C., the efficiency is shown to exceed 25%. This high efficiency is comparable to or exceeds systems based on solar cells. Hence, the renewed interest in the trans-critical $CO_2$ cycle.

There are three assumptions upon which these results depend. First is the assumption that the low end pressure is below the critical pressure. The critical pressure is 73.8 bar, and the examples in the literature are at 60 bar or below. This is the natural assumption for the refrigeration system where a phase change is desired to enhance the cooling step. But for the expander system, the low end pressure does not need to be below the critical pressure, and, in fact, the efficiency is much better when the low end pressure is higher. Second is the assumption that the low end temperature is 22° C. (this is 72° F.), or at least below the critical temperature of 31° C.

This temperature is reached by blowing air (or flowing water) through a radiator to exhaust the waste heat. If the ambient temperature (or water temperature) is above 72° F., the efficiency of the system with these operating pressures drops quickly. Third is the assumption that the internal heat exchanger can transfer the heat in such a way that the exit temperature on the cold side (at position 5 in FIG. 6) is only 5° C. above the inlet temperature at position 2. If the internal heat exchanger is not that effective, or it is not very nearly 100% efficient, then the system efficiency again drops quickly. These three issues are discussed in more detail below, and is the material that is added with the Rankine Expander System.

Figure 8:
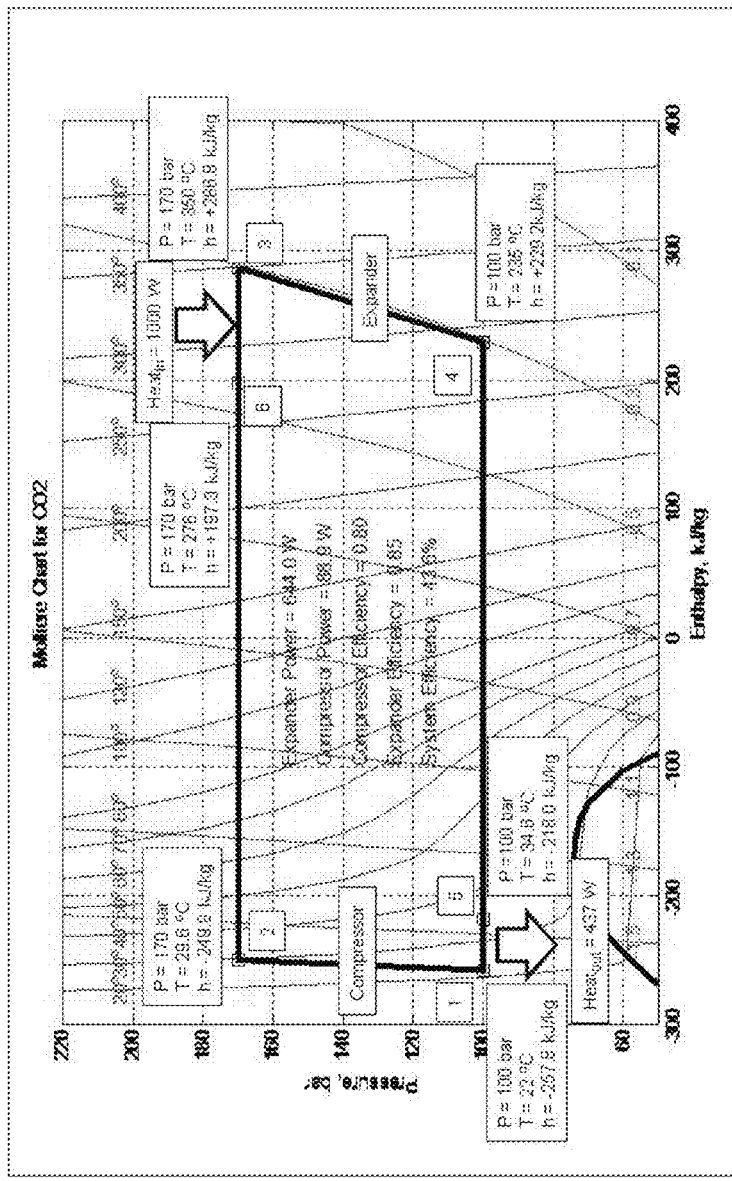
FIG. 8 shows the example expander cycle with internal heat exchanger where the entire cycle is above the critical pressure.

Variation with Pressure:

For the expander system, the low end pressure is not restricted to be below the critical pressure. The expander will generate power even when all the pressures are above 73.8 bar. An example of this is shown in FIG. 8. For this example, the low end pressure is held at 100 bar while the upper pressure and temperature are the same as in FIG. 6. This figure shows that for an input of 1 kW heat, the expander extracts 644 W giving an output net power (after considering inefficiency and the power needed for the compressor) of 436 W. The predicted efficiency for this cycle is a startling value of 43.6%. The high efficiency is a result of the internal heat exchanger. Because of the shape of the isotherm lines, the internal heat exchanger is able to transfer a larger amount of heat energy from the exhaust of the expander to the output of the compressor.

Figure 9:
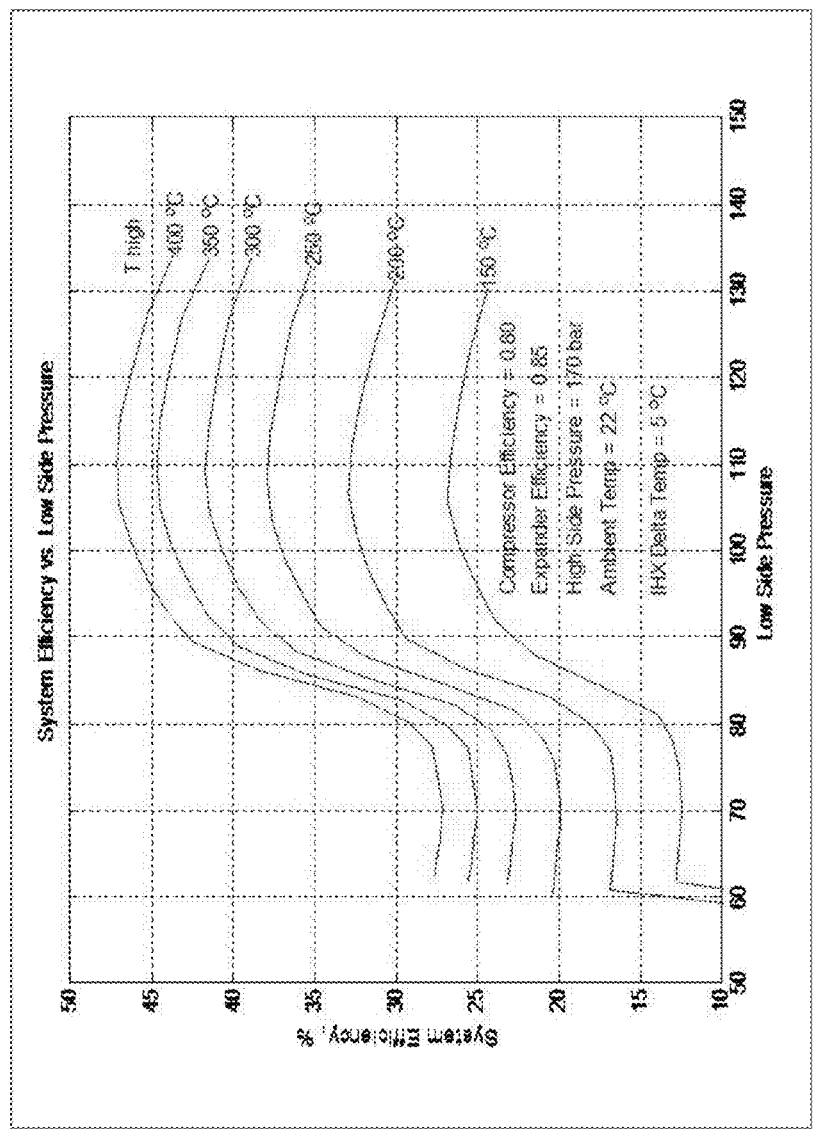
FIG. 9 shows the efficiency of the example Expander System as a function of the low end pressure for various values of the high end temperature.

The efficiency of the Expander system with the internal heat exchanger improves as the low end pressure increases, all other parameters being held constant. This is shown in FIG. 9. Here, the high end pressure is held constant at 170 bar, the high end temperature is held constant at 350° C., and the low end ambient temperature is held constant at 22° C. The points at the low end pressure of 62 bar correspond with the values in FIG. 7 for the temperature of 350° C. While the earlier results of efficiencies above 20% renewed the interest in $CO_2$ systems, the actual performance is even better, falling above 40%-45%. The rapid rise in the curves for low end pressures between 80 and 90 bar are a direct result of the shape of the isotherms in the Molliere diagram. This high efficiency is due entirely to the performance of the internal heat exchanger. In transferring heat from the expander output to a temperature within 5° C. of the compressor output temperature, the internal heat exchanger is able to transfer more heat energy as the low side pressure increases. The ability of the exchanger to do this is a key feature of the Rankine Expander System, and the importance will be discussed below.

Figure 10:
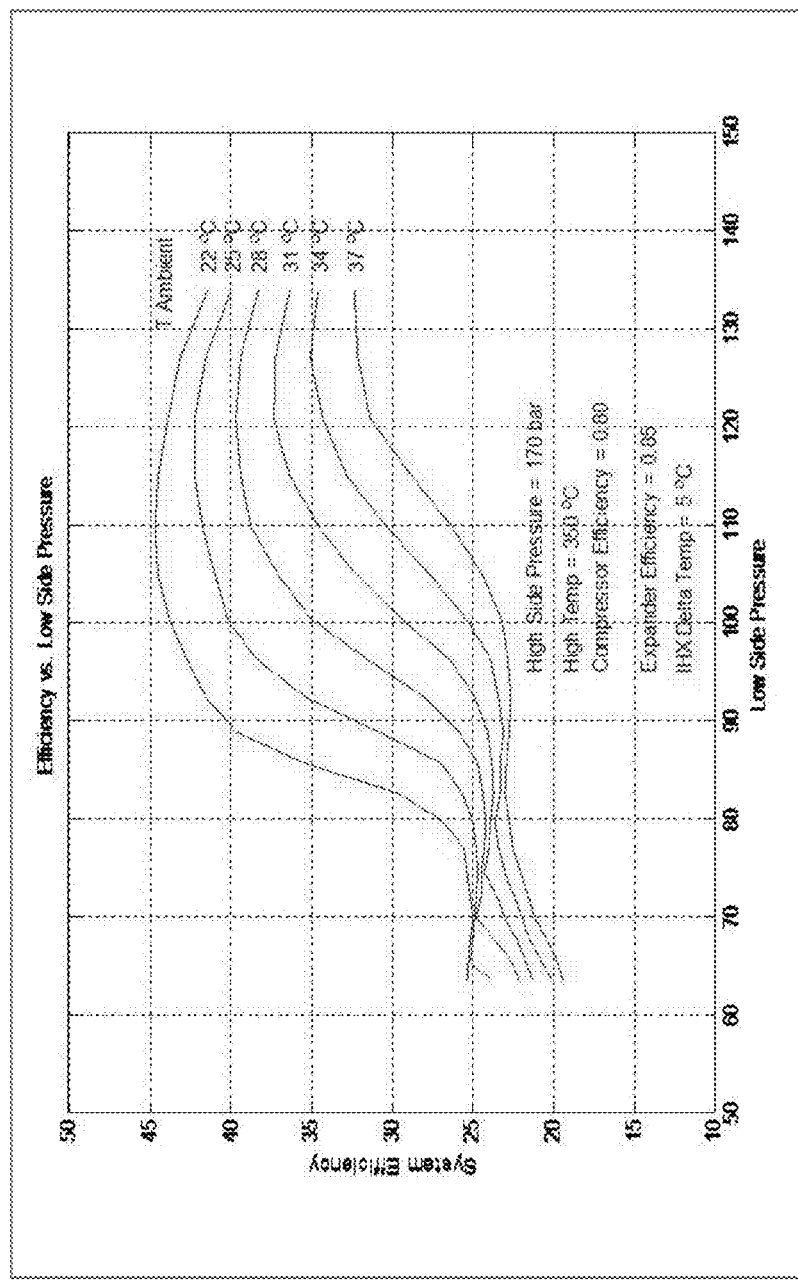
FIG. 10 shows the efficiency of the example Expander System as a function of the ambient temperature of the exhausted heat.

Variation with Low End Temperature:

One of the difficulties with the predicted performance of the above expander system is the dependence upon a condensing temperature of 22° C. If the ambient temperature is above this temperature the efficiency of the system with these operating pressures drops quickly. This is shown in FIG. 10. Here, the top curve is the same as in FIG. 9 for the case where the high end temperature is 350° C. As the ambient temperature increases, the efficiency drops and the maximum moves toward higher low end pressures. But still the efficiencies are impressive. At an ambient temperature of 37° C. (98.6° F.) the efficiency is above 32% for a low end pressure of ~130 bar.

Figure 11:
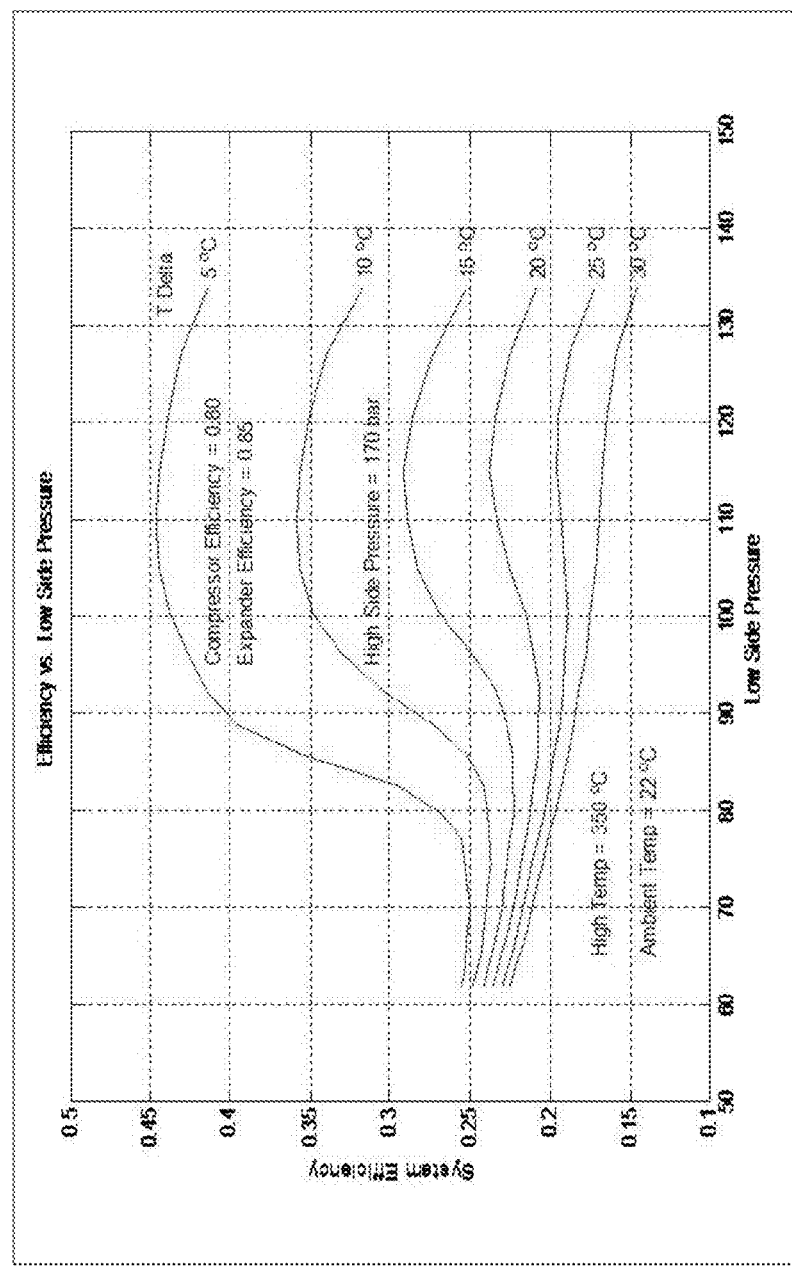
FIG. 11 shows the efficiency of the example Expander System as a function of the temperature difference between the input and output at the low temperature end of the internal heat exchanger.

Variation with Internal Heat Exchanger Performance:

The performance of the Expander System also depends strongly on the performance of the internal heat exchanger. In the literature[3], the internal heat exchanger is assumed to give an outlet temperature on the low pressure side equal to only 5° C. above the inlet temperature on the high pressure side. Building a heat exchanger that performs this well with temperature differences from the front to back of nearly 200° C. is a significant design challenge. If the performance is not that good, the efficiency of the expander system is degraded. This is shown in FIG. 11. Here, again, the top curve is the same as the curve in FIG. 9 for the case of the top temperature being 350° C., and is the same as the top curve in FIG. 10 for the case of the ambient temperature being 22° C. FIG. 11 shows that as delta temperature at the outlet of the internal heat exchanger increases, the efficiency drops quickly. The high end temperature is 350° C. and the high end pressure is 170 bar for all plots.

The heat exchanger is doing the important function of reusing the heat energy exhausted from the expander to pre-heat the $CO_2$ that goes into the main heater. It is actually moving more heat energy between parts of the system than is input from the outside. For example, in the case where the efficiency is near 44%, the heat exchanger is transferring 6.35 kW of heat energy for every 1 kW of external heat added. If the delta temperature for the heat exchanger is 20° C., then the efficiency drops to 24% and the amount of heat transferred by the heat exchanger drops to 3.38 kW for every 1 kW of external heat added. The performance of the expander system directly depends on the amount of heat transferred by the heat exchanger, and hence its design is critical.

Figure 12:
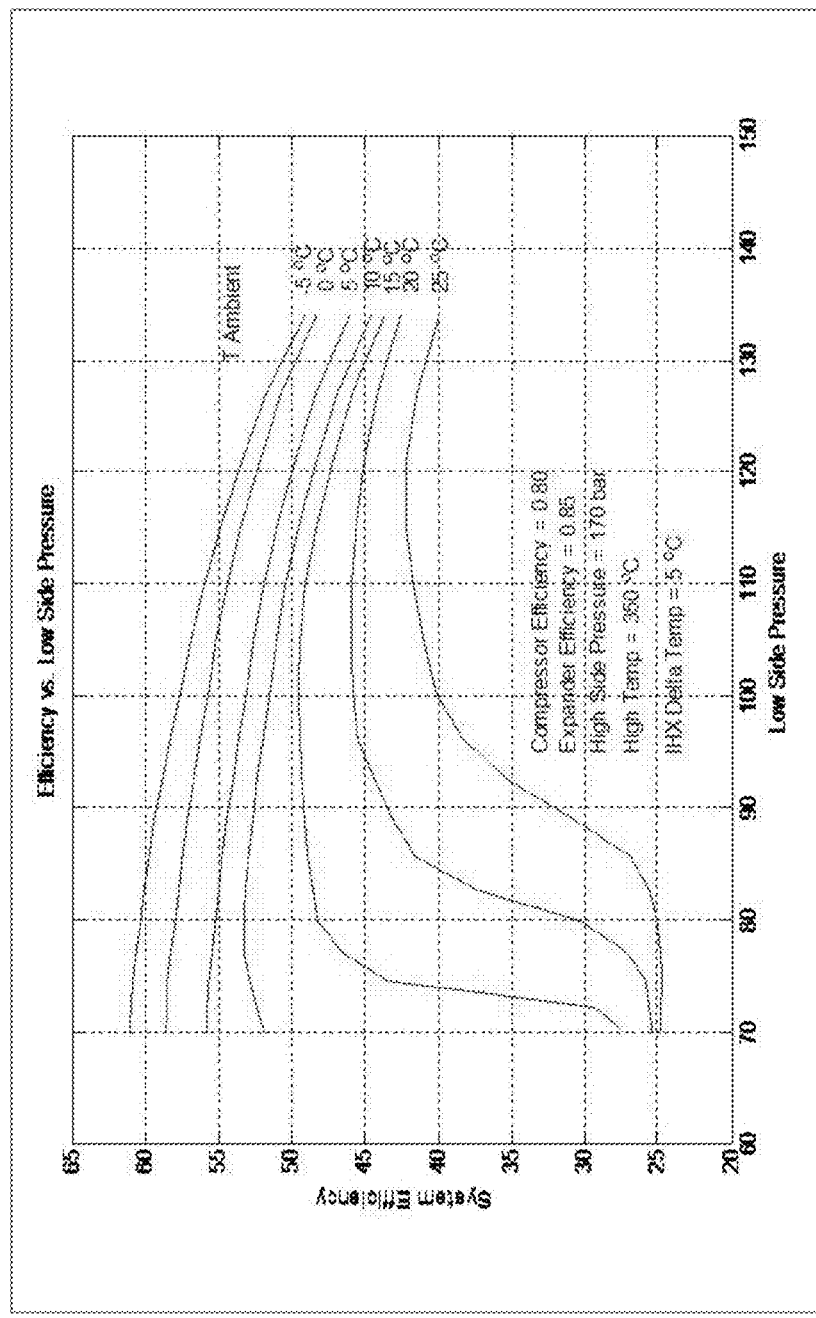
FIG. 12 shows the efficiency of the example Expander System as a function of the external ambient temperature.

For certain environments, the expander system can have truly astonishing efficiencies. For example, for northern latitudes with cold outside temperatures where commercial facilities have their own power generators, an add-on expander system can produce additional electricity very effectively. By using the waste heat from the power generation equipment, the expander system can very efficiently augment the power generation. This is shown in FIG. 12. For the case where the outside temperature is at freezing (0° C.), the expander efficiency can approach 60% for low outside temperatures making this system attractive for northern locations. Such high efficiency is unheard of in other power generation systems.

Rankine Expander Design:

The Rankine Expander System describe here based on the trans-critical properties of $CO_2$ can produce electricity from low quality heat with good efficiency. The system is based on six elements, a compressor, an expander, a permanent magnet alternator, and three heat exchangers. This paper has shown that very high efficiencies can be realized when the system operates at pressures above the critical point. Key to the high efficiencies is an internal heat exchanger that moves significant amounts of heat energy from the output of the expander to the output of the compressor. Also important is the ambient temperature which sets the low end temperature of the cycle.

A pressure adjustment feature to optimize efficiency of a $CO_2$ Rankine cycle engine can be provided. FIGS. 9 and 12 show the relationship of ambient temperature and low end pressure to performance. Therefore it would also be desirable to optimize performance of the heat recovery to be able to adjust the low end pressure in day to day and season to season operation. Provided is a described variation of the $CO_2$ Rankine cycle engine circuit that would perform this task. Included is a feature, not shown, that would be a variation of the circuit diagram of FIG. 1.

On the High pressure side of the circuit, most likely after the compressor and/or before the expander, is a solenoid operated valve that can be opened and closed on command by a microprocessor, leading to the inlet opening of a reservoir tank. The compressor charges the high side circuit with a pressure of up to 200 bar or atmospheres of pressure and if the solenoid is open the reservoir tank would be charged with CO2. This would work in conjunction with the companion solenoid valve just before the expander that would shut off gas flow to the expander with the resulting action being to deplete the low pressure side of the circuit of CO2 working fluid while the compressor was operating. By opening and closing these valves the low end pressure can be adjusted to reach an optimum pressure to maximize conversion efficiency.

Figure 13:
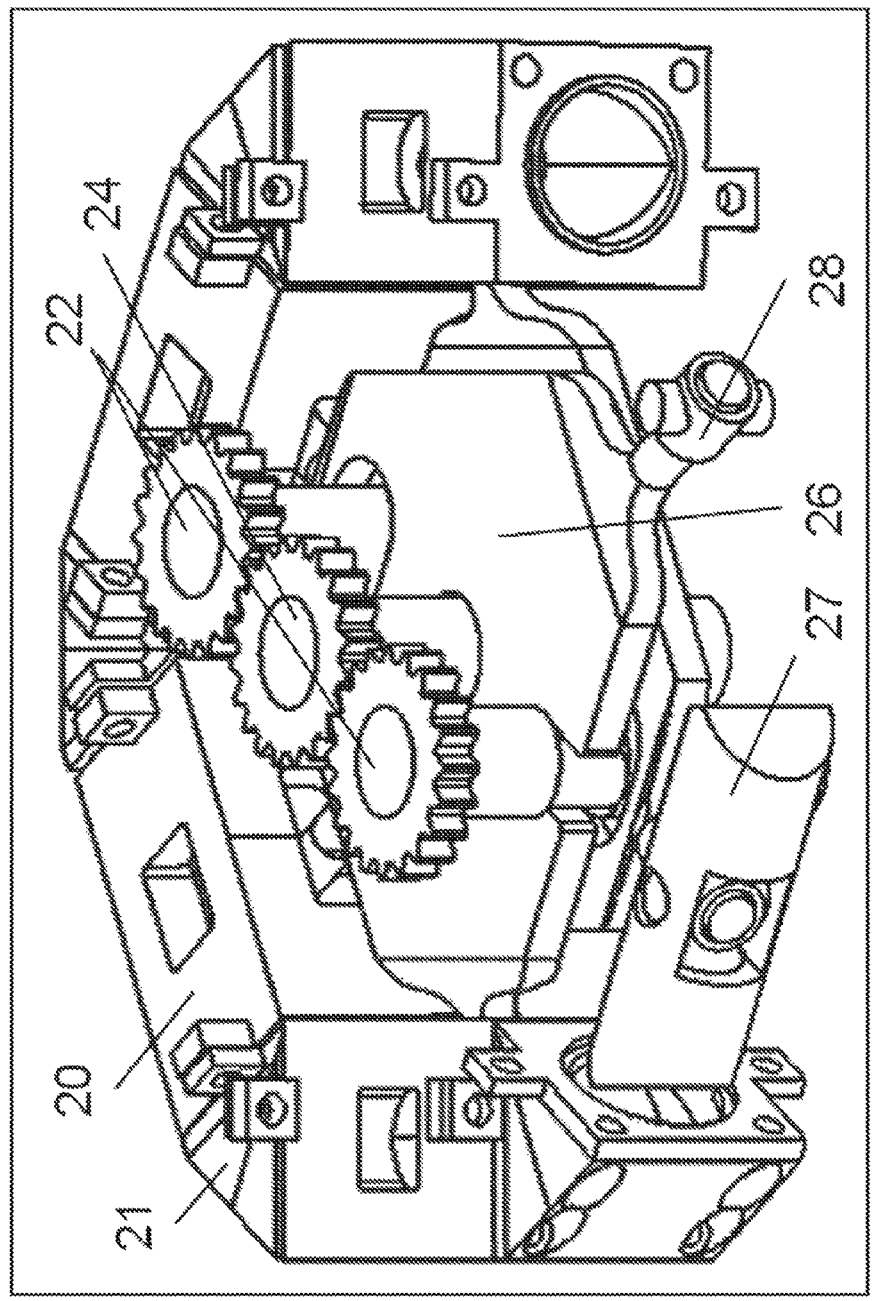
FIG. 13 shows one example embodiment of an engine that can be used as the expander 10 of FIG. 1.

FIG. 13 shows one embodiment of a piston expander that could be used for the expander 10 of FIG. 1, as disclosed in provisional application Ser. No. 61/625,940 filed on Apr. 18, 2012 and incorporated herein by reference. FIG. 13 shows a Polygon Oscillating Piston Engine with six chambers. This engine has the unique feature of providing very high torque and is therefore ideal to drive a PMA under high electrical load. The Polygon Oscillating Piston Engine is a derivative of the Toroidal Oscillating Piston Engine described in patent Ser. No. 13/074,510. However, almost any other configuration of piston engine could be used in the Waste Heat Electrical Generation System.

FIG. 13 shows a Hexagonal Polygon Oscillating Piston Engine. There are six chambers 20 and six corner pieces 21 that form a closed polygon. The six pistons 27 move back and forth in the chambers with motion coordinated by having alternate pistons connected via two disks 26 (three pistons for each disk). The piston pegs on each disk ride on six piston sleeves 28 while the pistons move back and forth in their respective chambers. Each disk 26 rides on a cam on one of two crank shafts 22. Each crank shaft 22 is connected to the main shaft 24 via drive gears. The corner chambers 20 contain the inlet injector and the outlet exhaust valve. The timing of the inlet injector is critical for the operation of the engine as an expander.

Figure 14:
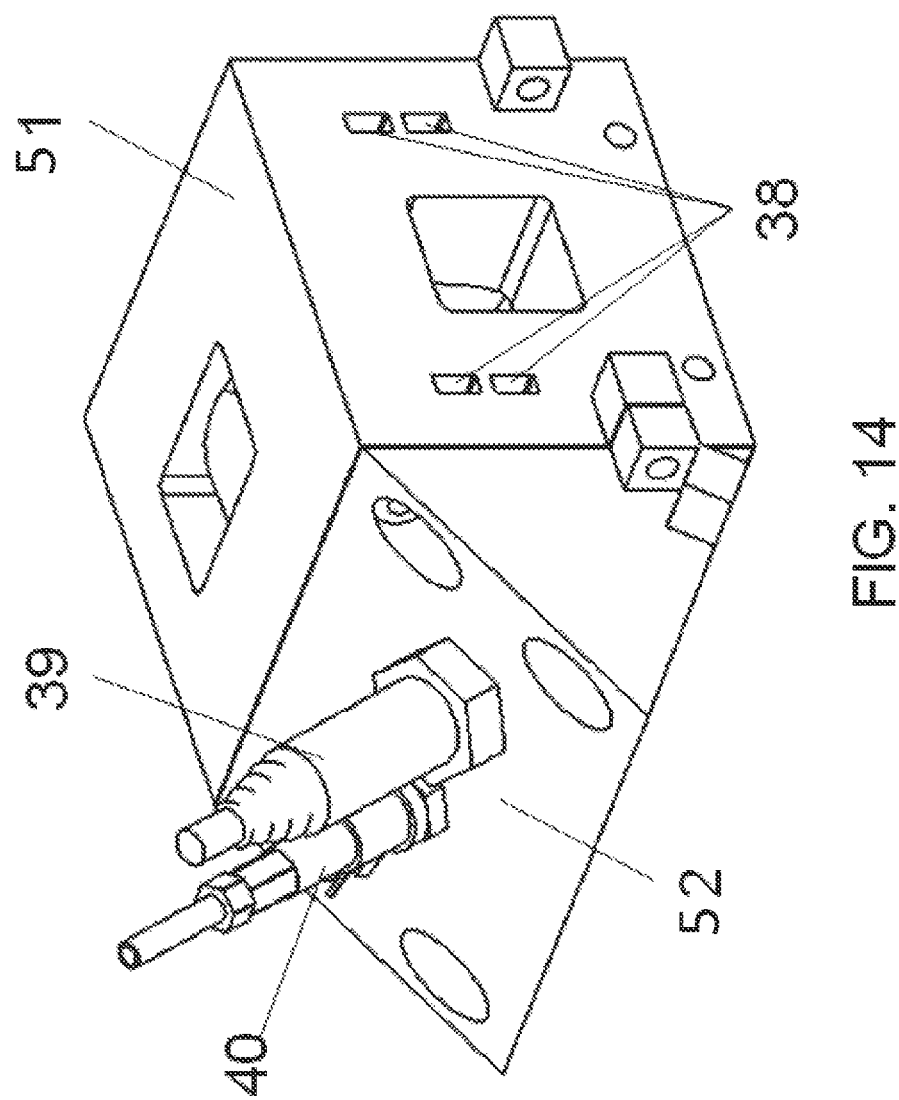
FIG. 14 is a schematic showing an example location of an exhaust port, fuel injector and spark plug for the example expander of FIG. 13.
Figure 15:
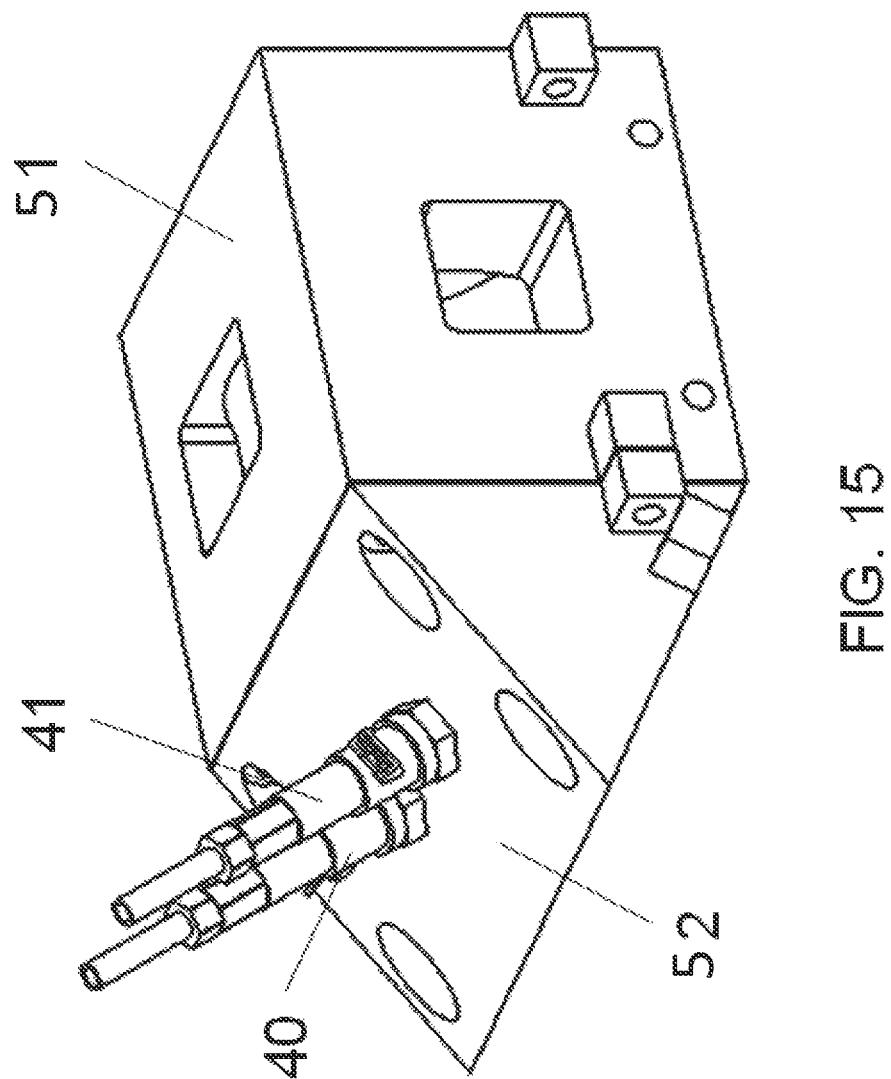
FIG. 15 is a schematic showing an example location of the inlet and exhaust injectors for the example expander of FIG. 13.

FIGS. 14-15 show some of the desired modifications to the polygon oscillating engine of FIG. 13. FIG. 14 shows the possible location of the exhaust port, the fuel injector and the spark plug for the two cycle embodiment of the Polygon Oscillating Piston Engine, whereas FIG. 15 shows the possible location of the inlet and exhaust injectors for the expander embodiment of the Polygon Oscillating Piston Engine.

FIG. 14 shows for the two cycle embodiment of the Polygon Oscillating Piston Engine the location of the spark plug 39 and the fuel injector 40 which would be on each of the corner combustion chambers 52. Also shown is one possible location of the exhaust ports 38 which would be on every other piston cylinder 51. The two cycle embodiment can have both inlet and exhaust ports, or exhaust ports only with a fuel injector as shown in FIG. 14.

FIG. 15 shows for the expander embodiment of the Polygon Oscillating Piston Engine the location of two separate injectors. Injector 40 is the inlet injector which is open for part of the stroke of the piston wherein hot high pressure gas enters the piston chamber. The inlet injector 40 then closes and the gas expands and cools as the piston continues toward the limit of its motion within piston cylinder 51. Then the exhaust injector 41 opens, and the cooler lower pressure gas is pushed out of the chamber as the piston returns to its top dead center position. Both injectors are located in the corner combustion chamber 52, although no combustion occurs in the expander embodiment.

Additional discussion of the components discussed in FIG. 1 can be found in provisional application Ser. No. 61/636,236, filed on Apr. 20, 2012, and incorporated herein by reference in its entirety. Provisional application Ser. No. 61/477,762, filed on Apr. 21, 2011, and incorporated herein by reference, discusses a number of applications for the oscillating engines that are referenced by this document that can also be applied.

Thus disclosed is a Rankine Expander System that converts low quality heat (heat usually at temperatures below 400 degrees Celsius) to electricity by using the properties of trans-critical CO2. The system is comprised of a compressor, an expander, three heat exchangers, and a permanent magnet alternator (PMA). It can operate at pressures and temperatures that hold the CO2 above its critical point for the full cycle, and as such, attains high efficiencies even at low power. Under some conditions the efficiency can exceed 50%. This makes the Rankine Expander System ideal for use with solar heat collectors, or using the waste heat from power generators, internal combustion engines, or even nuclear waste. This paper shows the operating conditions used to attain high efficiencies, and how these efficiencies can vary with controllable design parameters.

The following documents are incorporated herein by reference:

MegaWatSoft, inc. on www.carbon-dioxide-properties-.com/default.aspx. The web site features a $CO_2$ properties calculator.

Transcritical R744 (CO2) heat pumps, Technician's Manual, put out by the CENTRE TECHNIQUE DES INDUSTRIES AÉRAULIQUES ET THERMIQUES (CE-TIAT) sponsored by SHERPA (Sustainable Heat and Energy Research for Heat Pump Applications), October 2007.

Platell and Dudzik, Zero Energy Houses; in Proceedings of ES2007, Energy Sustainability Conference, Jun. 27, 2007, Long Beach, Calif.

What is claimed is:

1. A closed-loop $CO_2$ system for capturing waste heat comprising:
    a heat exchanger configured for transferring heat from a lower pressure part of said closed-loop system to a higher pressure part of said closed-loop system;
    a cooler configured for receiving lower pressure $CO_2$ from said heat exchanger for exhausting waste heat from said closed-loop system and cooling the $CO_2$ to a temperature below the critical temperature of $CO_2$;
    a compressor configured for compressing lower pressure $CO_2$ received from said cooler at a temperature below the critical temperature of $CO_2$ into higher pressure $CO_2$ for outputting supercritical $CO_2$ to said heat exchanger;
    another heat exchanger configured to receive higher pressure $CO_2$ from said heat exchanger and further configured for inputting additional heat energy obtained from outside said closed-loop system into the higher pressure $CO_2$; and
    a piston expander comprising a plurality of piston pairs having opposing pistons, each piston pair being associated with a associated shared expansion chamber configured to support linear travel of said pistons and configured for receiving the higher pressure $CO_2$ to convert the higher pressure $CO_2$ into a lower pressure $CO_2$ to output a rotational torque to drive a load, wherein the lower pressure $CO_2$ output by said expander is input into said heat exchanger, wherein
    at all points the lower pressure $CO_2$ is maintained at a pressure above the critical point pressure of $CO_2$.

2. The system of claim 1, wherein at all points the higher pressure $CO_2$ is maintained below 200 bar.

3. The system of claim 1, wherein said $CO_2$ is maintained at a temperature between 0° C. and 400° C.

4. The system of claim 1, wherein said expander is comprised of a plurality of said pistons arranged around the circumference of one disk for oscillating the one disk for outputting said rotational torque.

5. The system of claim 1, wherein for the entire closed loop, said $CO_2$ is maintained at a temperature between 0° C. and 400° C., and wherein for the entire closed loop, said $CO_2$ is maintained between a pressure of at least about 80 bar and a pressure of no more than about 200 bar.

6. A closed-loop $CO_2$ system for capturing waste heat comprising:
   a heat exchanger configured for transferring heat from a lower pressure part of said closed-loop system to a higher pressure part of said closed-loop system;
   a cooler configured for receiving lower pressure $CO_2$ from said heat exchanger for exhausting waste heat from said closed-loop system and cooling the $CO_2$ to a temperature below the critical temperature of $CO_2$;
   a compressor configured for compressing lower pressure $CO_2$ received from said cooler into higher pressure $CO_2$ for outputting supercritical $CO_2$ to said heat exchanger;
   another heat exchanger configured to receive higher pressure $CO_2$ from said heat exchanger and also configured for inputting additional heat energy obtained from outside said closed-loop system into the higher pressure $CO_2$; and
   an expander configured for receiving the higher pressure $CO_2$ to convert the higher pressure $CO_2$ into a lower pressure $CO_2$ for outputting rotational torque, wherein the lower pressure $CO_2$ is output by said expander for input into said heat exchanger, wherein
   for the entire closed loop, said $CO_2$ is maintained between a pressure of at least about 80 bar and a pressure of no more than about 200 bar, and further wherein
   for the entire closed loop, said $CO_2$ is maintained at a temperature between 0° C. and 400° C., wherein
   said expander is comprised of a plurality of paired opposed pistons configured for linear travel in a common expansion chamber, wherein for each piston pair, the opposing pistons are each installed on a circumference of a different disk in a configuration provided to oscillate the different disks in opposing directions both configured to provide a rotational torque to a shaft for driving a load, with the expander being configured for generating said rotational torque through the converting of the higher pressure $CO_2$ into lower pressure $CO_2$.

7. The system of claim 6, wherein said expander is comprised of a plurality of said pistons driving at least one oscillating disk for outputting said rotational torque.

8. A closed-loop $CO_2$ system for capturing waste heat comprising:
   a first heat exchanger configured for transferring heat from a lower pressure part of said closed-loop system to a higher pressure part of said closed-loop system;
   a cooler configured for receiving lower pressure $CO_2$ from said heat exchanger for exhausting waste heat from said closed-loop system and cooling the $CO_2$ to a temperature below the critical temperature of $CO_2$;
   a compressor configured for compressing lower pressure $CO_2$ received from said cooler into higher pressure $CO_2$ for outputting supercritical $CO_2$ to said heat exchanger;
   a second heat exchanger configured to receive higher pressure $CO_2$ from said first heat exchanger and also configured for inputting additional heat energy obtained from outside said closed-loop system into the higher pressure $CO_2$; and
   an expander including a plurality of pistons arranged as pairs of opposed pistons configured to travel in a linear motion in a respective expansion chamber associated with the piston pair, each piston of said piston pair being severably installed on and driving a separate oscillating disk configured to output a rotational torque to a load, said expander being adapted to receive the heated $CO_2$ from said second heat exchanger to convert the heated $CO_2$ into lower pressure $CO_2$ via an expansion process using said oscillating disks for outputting said rotational torque, wherein lower pressure $CO_2$ is output by said expander for input into said first heat exchanger.

9. The system of claim 8, wherein at all points the lower pressure $CO_2$ is maintained at a pressure above the critical point pressure of $CO_2$.

10. The system of claim 8, wherein the pistons of said piston expander are arranged on a circumference of the disk and wherein said pistons travel in a linear motion tangential to the disk within an expansion chamber.

11. The system of claim 8, further comprising an electrical generator mechanically connected to said piston expander in a manner configured for transmitting a torque from said piston expander to said electrical generator.

12. The system of claim 6, wherein a plurality of the one or more pistons of said piston expander are arranged on a circumference of a disk and wherein said pistons travel in a linear motion tangential to the disk within an expansion chamber.

13. The system of claim 6, further comprising an electrical generator mechanically connected to said piston expander in a manner configured for transmitting a torque from said piston expander to said electrical generator.

14. The system of claim 1, wherein a plurality of the one or more pistons of said piston expander are arranged on a circumference of a disk and wherein said pistons travel in a linear motion tangential to the disk within an expansion chamber.

15. The system of claim 1, further comprising an electrical generator mechanically connected to said piston expander in a manner configured for transmitting a torque from said piston expander to said electrical generator.

16. A closed-loop $CO_2$ system for capturing waste heat comprising:
   a first heat exchanger configured for transferring heat from a lower pressure part of said closed-loop system to a higher pressure part of said closed-loop system;
   a cooler configured for receiving lower pressure $CO_2$ from said heat exchanger for exhausting waste heat from said closed-loop system;
   a compressor configured for compressing lower pressure $CO_2$ received from said cooler into higher pressure $CO_2$ for outputting to said heat exchanger;
   a second heat exchanger configured to receive higher pressure $CO_2$ from said first heat exchanger and also configured for inputting additional heat energy obtained from outside said closed-loop system into the higher pressure $CO_2$; and
   an expander including a plurality of pistons arranged as pairs of opposed pistons having a common expansion chamber associated with the piston pair, each piston of said piston pair being installed on a circumference of a different disk with said pistons being configured to travel in a linear motion within a respective static expansion volume for oscillating said disks in a manner configured to generate a rotational torque for driving a load, said expander being adapted for receiving the heated $CO_2$ from the second heat exchanger to convert the heated $CO_2$ into lower pressure $CO_2$ via an expansion process using said pistons for generating said rotational torque, wherein lower pressure $CO_2$ is output by said expander for input into said first heat exchanger.

17. The system of claim 16, wherein at all points the lower pressure $CO_2$ is maintained at a pressure above the critical point pressure of $CO_2$.

18. The system of claim 16, further comprising an electrical generator mechanically connected to said piston expander in a manner configured for transmitting a torque from said piston expander to said electrical generator.

19. A closed-loop $CO_2$ system for capturing waste heat, said system comprising:
- a first heat exchanger configured for transferring heat from a lower pressure part of said closed-loop system to a higher pressure part of said closed-loop system;
- a cooler configured for receiving lower pressure $CO_2$ from said heat exchanger for exhausting waste heat from said closed-loop system;
- a compressor configured for compressing lower pressure $CO_2$ received from said cooler into higher pressure $CO_2$ for outputting supercritical $CO_2$ to said heat exchanger;
- a second heat exchanger configured to receive higher pressure $CO_2$ from said first heat exchanger and also configured for inputting additional heat energy obtained from outside said closed-loop system into the higher pressure $CO_2$; and
- an expander configured to receive the heated $CO_2$ to convert the heated $CO_2$ into lower pressure $CO_2$ for outputting rotational torque to a load, wherein the lower pressure $CO_2$ output by said expander is input into said first heat exchanger, wherein said expander includes at least one opposing pair of pistons sharing an expansion chamber configured such that said pistons travel in a linear motion, each piston being mounted on respective disks and configured to convert energy of the $CO_2$ for oscillating the disks about an axis of the disks with a drive shaft passing through a hole in the axis of the disks for receiving the rotational torque; and
- an electrical generator mechanically connected to said drive shaft in a manner configured for transmitting the rotational torque to said electrical generator, wherein at all points the lower pressure $CO_2$ is maintained at a pressure above the critical point pressure of $CO_2$.

20. The system of claim 19, wherein said expander is configured with the drive shaft outputting the torque to the electrical generator.

21. A closed-loop $CO_2$ system for capturing waste heat comprising:
- a first heat exchanger configured for transferring heat from a lower pressure part of said closed-loop system to a higher pressure part of said closed-loop system;
- a cooler configured for receiving lower pressure $CO_2$ from said first heat exchanger for exhausting waste heat from said closed-loop system and cooling the $CO_2$ to a temperature below the critical temperature of $CO_2$;
- a compressor configured for compressing lower pressure $CO_2$ received from said cooler at a temperature below the critical temperature of $CO_2$ into higher pressure $CO_2$ for outputting to said heat exchanger;
- a second heat exchanger configured to receive higher pressure $CO_2$ from said first heat exchanger and further configured for inputting heat energy obtained from outside said closed-loop system into the higher pressure $CO_2$; and
- an expander comprising a plurality of disks with at least one piston being mounted on each one of said disks, said pistons being configured in piston pairs each sharing a common expansion volume configured for the pistons traveling in a linear motion to drive said disks in opposing oscillating motions for rotating a shaft traveling through said disks for outputting a torque, wherein
- the expander is configured to receive the higher pressure $CO_2$ from said second heat exchanger for converting into rotational torque, wherein lower energy $CO_2$ output by said expander is input into said first heat exchanger for providing heat energy to said first heat exchanger and for supplying said lower pressure $CO_2$ to said cooler.

22. The system of claim 21, wherein said expander is comprised of one or more pistons each associated with at least one expansion chamber, said one or more pistons being mounted on a circumference of at least one disk such that an oscillation of the one or more disks is converted into a rotational torque output from said expander to drive a load.

23. The system of claim 21, wherein at all points the lower pressure $CO_2$ is maintained at a pressure above the critical point pressure of $CO_2$.

* * * * *